United States Patent [19]

Dieck

[11] 4,239,677

[45] Dec. 16, 1980

[54] MODIFIED POLYESTER COMPOSITIONS

[75] Inventor: Ronald L. Dieck, Evansville, Ind.

[73] Assignee: General Electric Company, Pittsfield, Mass.

[21] Appl. No.: 1,539

[22] Filed: Jan. 8, 1979

[51] Int. Cl.$^3$ .................... C08K 3/40; C08L 67/00; C08L 67/06
[52] U.S. Cl. .................... 260/40 R; 260/45.7 R; 260/45.7 P; 260/45.75 B; 260/45.9 R; 525/439; 525/444; 525/445
[58] Field of Search .................... 260/873, 40 R, 869, 260/45.7 P, 45.7 R, 45.75 B, 40 R, 45.9 R; 525/93, 95, 89, 91, 439, 444, 445

[56] References Cited

U.S. PATENT DOCUMENTS

| | | | |
|---|---|---|---|
| 3,953,394 | 4/1976 | Fox et al. | 260/873 |
| 3,969,306 | 7/1976 | Borman et al. | 260/873 |

OTHER PUBLICATIONS

"Styrene-Diene-Lactone Block Copolymers", Hsieh, J. Applied Polymer Sci., vol. 22, 1119–1127, (1978).

*Primary Examiner*—J. Ziegler
*Attorney, Agent, or Firm*—Morgan, Finnegan, Pine, Foley & Lee

[57] ABSTRACT

Modified thermoplastic polyester compositions are provided which comprise (a) a poly-(1,4-butylene terephthalate) resin or polyester copolymer and, optionally, a poly(ethylene terephthalate) resin and (b) a modifier therefor comprising a combination of a linear or branched rubbery polyester end blocked copolymer of a vinyl aromatic and a conjugated diene and/or a polyester end blocked homopolymer of a conjugated diene or vinyl aromatic and an aromatic polycarbonate, and optionally (c) filler and/or reinforcing agent and/or (d) a flame retardant. Modifier (b) provides enhanced resistance to impact fracture, increased strength and improved resistance to heat distortion in articles molded from the compositions.

20 Claims, No Drawings

MODIFIED POLYESTER COMPOSITIONS

This invention relates to modified thermoplastic polyester compositions which are moldable articles of improved impact strength and thermal resistance. More particularly, the invention pertains to compositions of (a) a poly(1,4-butylene terephthalate) resin or a polyester copolymer resin and, optionally, a poly(ethylene terephthalate) resin which are modified with (b) an effective amount of a resinous combination comprising a linear or branched rubbery polyester end blocked copolymer of a vinyl aromatic and a conjugated diene and/or a polyester and blocked homopolymer of a conjugated diene or vinyl aromatic and an aromatic polycarbonate and, optionally, (c) filler and/or reinforcing agent and/or (d) a flame retardant.

BACKGROUND OF THE INVENTION

High molecular weight linear polyesters and copolyesters of glycols and terephthalic or isophthalic acid have been available for a number of years. There are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic-/aliphatic or aliphatic polyesters are also known. See, copending application, U.S. Pat. No. 752,325, filed Dec. 20, 1976 by Borman, Dolce and Kramer, incorporated herein by reference. Such block copolyesters are useful per se as molding resins and also in intimate combination with poly(1,4-butylene terephthalate) and/or poly(ethylene terephthalate).

It has been proposed to increase the impact strengths of polyesters by adding various modifiers. For example, Brinkmann et al in U.S. Pat. No. 3,591,659 disclose that a useful family of modifiers comprises polyalkyl acrylates, methacrylates and/or ethacrylates. Baron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer haveing a glass temperature below −20° C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German 2650870) disclose an impact modifier combination comprising a blend of a polyurethane and an aromatic polycarbonate. Copending application Ser. No. 870,679, filed Jan. 19, 1978, discloses an impact modifier combination comprising a segmented block copolyester and an aromatic polycarbonate. Seymour et al in U.S. Pat. No. 4,011,285 describe molding compositions comprising a blend of poly(1,4-butylene terephthalate), a polyetherester and a radial teleblock copolymer. Gergen et al, U.S. Pat. No. 4,090,996, disclose an impact modifier combination comprising a selectively hydrogenated monoalkenyl arene-diene block copolymer, and an engineering thermoplastic, e.g., poly(aryl ether), poly(aryl sulfone), polycarbonate, acetal, etc. Copending application Ser. No. 966,864, filed Dec. 6, 1978 describes combinations comprising polyesters, linear block copolymers and aromatic polycarbonates. All of the foregoing patents and the applications are incorporated herein by reference. Filled reinforced and/or flame retardant modifications of such polyesters are also well known in the art.

It has now been discovered that such polyesters can be greatly improved in impact strength, as well as distortion temperature under load (DTUL), by intimately admixing therewith an impact improving modifier combination comprising a linear or branched rubbery polyester end-blocked copolymer of a vinyl aromatic and a conjugated diene and/or a polyester end blocked homopolymer of a conjugated diene or vinyl aromatic and an aromatic polycarbonate resin. Compositions modified with a polar blocked copolymer resins in combination with the aromatic polycarbonate are significantly superior, for example, in toughness to compositions modified with other copolymers. As will be shown, the new compositions of this invention can be reinforced, filled, reinforced and filled, and all modifications can be rendered flame-retardant.

DESCRIPTION OF THE INVENTION

According to this invention, there are provided thermoplastic compositions which are useful for molding, e.g., injection molding, compression molding, transfer molding, and the like, the compositions comprising:
(a) a polyester comprising:
 (i) a poly(1,4-butylene terephthalate) resin;
 (ii) a blend of a poly(1,4-butylene terephthalate) resin and a poly(ethylene terephthalate) resin;
 (iii) a block copolyester of poly(1,4-butylene terephthalate) and an aromatic/aliphatic or aliphatic polyester;
 (iv) a blend of (iii) and a poly(ethylene terephthalate) resin; or
 (v) a blend of (iii) and a poly(1,4-butylene terephthalate) resin; and
(b) an impact modifier therefor comprising a combination of:
 (i) a linear or branched rubbery polyester end blocked copolymer of a vinyl aromatic and a conjugated diene and/or a polyester end blocked homopolymer of a conjugated diene or vinyl aromatic; and
 (ii) an aromatic polycarbonate resin, in an amount of up to 60 parts per 100 parts by weight of (a) and (b) together.

The polyester resins (a) of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. Nos. 2,465,319 and 3,047,539, and elsewhere. As has been mentioned, preparation of the block copolyesters is described in Borman, Dolce and Kramer, U.S. Ser. No. 752,325, filed Dec. 20, 1976, and incorporated herein by reference.

The block copolyesters which are useful in the practice of the present invention and which are described in the afore-mentioned copending U.S. Ser. No. 752,325, filed Dec. 20, 1976, are thermoplastic copolyesters which consist essentially of blocks derived from:

(a) a terminally-reactive poly(1,4-butylene terephthalate) and (b) (i) a terminally-reactive aromatic/aliphatic copolyester of a dicarboxylic acid selected from the group consisting of terephthalic acid, isophthalic acid; naphthalene dicarboxylic acids, phenyl indane dicarboxylic acid and compounds of the formula:

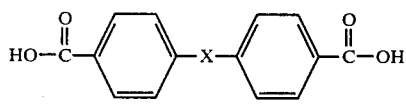

in which X may be alkylene or alkylidene of from 1 to 4 carbon atoms, carbonyl, sulfonyl, oxygen or a bond between the benzene rings and an aliphatic dicarboxylic acid having from 6 to 12 carbon atoms in the chain, with one or more straight or branched chain dihydric aliphatic glycols having from 4 to 10 carbon atoms in the chain, said copolyester having at least 10% and preferably, 35% of aliphatic units being derived from a dicarboxylic acid, or (ii) an aliphatic polyester of a straight chain aliphatic dicarboxylic acid having from 4 to 12 carbon atoms in the chain, and a straight or branched chain dihydric aliphatic glycol, said blocks being connected by interterminal linkages consisting essentially of ester linkages.

These copolyesters are prepared by the reaction of terminally-reactive poly(butylene terephthalate), preferably, low molecular weight, and a terminally-reactive copolyester or polyester as defined in paragraph (b), in the presence of a catalyst for transesterification, such as zinc acetate, manganese acetate, titanium esters, and the like. The terminal groups can comprise hydroxyl, carboxyl, carboalkoxy, and the like, including reactive derivatives thereof. The result of reaction between two terminally reactive groups, of course, must be an ester linkage. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments.

The copolyester or polyester designated component (b)(i) is preferably prepared from terephthalic acid or isophthalic acid or a reactive derivative thereof and a glycol, which may be a straight or branched chain aliphatic glycol. Illustratively, the glycol will be 1,4-butanediol; 1,5-pentanediol; 1,6-hexanediol; 1,9-nonanediol; 1,10-decanediol; neopentyl glycol; 1,4-cyclohexanediol; 1,4-cyclohexane dimethanol, a mixture of any of the foregoing, or the like. Illustrative of suitable aliphatic dicarboxylic acids for the mixed aromatic/aliphatic embodiments are suberic, sebacic, azelaic, adipic acids, and the like.

The copolyesters or the polyester designated component (b) may be prepared by ester interchange in accordance with standard procedures. The polyesters designated (b) (i) are most preferably derived from an aliphatic glycol and a mixture of aromatic and aliphatic dibasic acids in which the mole ratio concentration of aromatic to aliphatic acids is from between 1 to 9 and 9 to 1, with an especially preferred range being from about 3 to 7 to about 7 to 3.

The aliphatic polyesters designated component (b) (ii) contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic copolyesters (b) (i) and the aliphatic polyesters (b) (ii) are commercially available. One source for such materials is the Ruco Division/Hooker Chemical Company, Hicksville, N.Y., U.S.A., which designates its compounds as "Rucoflex."

By way of illustration, poly(neopentyl-adipate), poly(1,6-hexylene-neopentyl-adipate-isophthalate), poly(1,6-hexylene-(0.7)adipate-(0.3)isophthalate); poly(1,6-hexylene(0.5adipate)-(0.5)isophthalate) and poly(1,6-hexylene-(0.7)azelate-(0.3)isophthalate), each having a hydroxyl number in the range of 32 to 38, corresponding to a number average molecular weight of 3000 to 3500, may be used as the source of blocks. These polyesters, for example, are added, respectively, to a reactor after the ester interchange between 1,4-butanediol and dimethyl terephthalate is complete and any excess of butanediol has been removed by distillation under a mild vacuum.

The block copolyesters preferably comprise from 95 to 50 parts by weight of the segments of poly(1,4-butylene terephthalate). The poly(1,4-butylene terephthalate blocks, before incorporation into the block copolyesters, will preferably have an intrinsic viscosity of above 0.1 dl./g. and preferably, between 0.1 and 0.5 dl./g., as measured in a 60:40 mixture of phenol/tetrachloroethane at 30° C. The balance, 5 to 50 parts by weight of the copolyester will comprise blocks of component (b).

The poly(1,4-butylene terephthalate) block (a) can be straight chain or branched, e.g., by use of a branching component, e.g., 0.05 to 3 mole %, based on terephthalate units, of a branching component which contains at least three ester-forming groups. This can be a polyol, e.g., pentaerythritol, trimethylolpropane, and the like, or a polybasic acid compound, e.g., trimethyl trimesate, and the like.

Illustratively, the high molecular weight polyesters will have an intrinsic viscosity of at least about 0.4 deciliters/gram and preferably, at least 0.6 deciliters/gram as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

Impact modifier (b) comprises a combination of (i) a polar end capped vinyl aromatic and/or conjugated diene resin and (ii) an aromatic polycarbonate. The selectively polar end capped copolymer resins (b)(i) can be made in known ways and they are available from a commercial source, namely, Phillips Petroleum Co., under the trade designation Solprene PD-0082-78; PD-0220-78; PD-0221-78; PD-0222-78; and PD-0223-78. As an illustration, they can be made by incrementally polymerizing lactones, e.g., $\epsilon$-caprolactone, vinyl aromatic compounds, e.g., styrene, and/or a conjugated diene, e.g., butadiene, in the presence of an organometallic initiator, e.g., n-butyllithium to produce co-polymers which contain an active metal atom, such as lithium, on one end of each of the polymer chains. A specific method of preparation is described in detail in H. L. Hsieh "Styrene-Diene-Lactone Block Copolymers", J. Applied Polymer Science, Vol. 22, p. 119–1127 (1978), which is incorporated herein by reference.

The conjugated dienes of the polar end capped block copolymer include compounds such as 1,3-butadiene, isoprene, 2,3-dimethyl-1,3-butadiene, 1,3-pentadiene, 3-butyl-1,3-octadiene, and the like. The vinyl aromatic containing polymers may be prepared from vinyl aromatic compounds including styrene, 1-vinylnaphthalene, 2-vinylnaphthalene and the alkyl, cycloalkyl, aryl, alkaryl and aralkyl derivatives thereof. Examples include 3-methylstyrene, 4-n-propylstyrene, 4-cyclohexylstyrene, 4-4-(4-phenyl-n-butyl) styrene, and the like. The polyester end cappers can be derived from caprolactone, $\beta$-propiolactone, 2,2,4-trimethyl-3-hydroxy-3-pentenoic acid $\beta$-lactone, and the like.

In preferred compositions, the block copolymer will be comprised of units of styrene and/or butadiene, with terminal blocks derived from $\epsilon$-caprolactone.

The molecular weight of the block copolymer and the ratios of the co-monomers thereof can vary broadly. In preferred embodiments the inherent viscosities will range from about 0.6 to about 3.0. Preferably the block copolymers will comprise from 0 to 45 parts by weight of the vinyl aromatic compound from 99 to 45 parts by weight of the conjugated diene and from 5 to 50 parts by weight of the polyester blocks, per 100 parts by weight of the block copolymer. The polycarbonate resins (b)(ii) can be made in known ways and they are available commercially from sources, e.g., General Electric Company, Pittsfield, Mass., U.S.A. under the trademark LEXAN. In general, any of the aromatic polycarbonates described in Baron et al, U.S. Pat. No. 4,034,016 can be used, especially those including units derived from bisphenol-A.

In certain preferred features the composition will include fillers, especially reinforcing fillers such as fibrous (filamentous) glass and/or mineral fillers, such as clay, mica, talc and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcements are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, are the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.250 inch.

The amount of the reinforcement and/or filler can vary widely depending on the formulation and needs of the particular composition, it being essential only that an amount is selected which is at least sufficient to provide reinforcement. Preferably, however, the reinforcement and/or filler will comprise from about 1 to about 60% by weight of component (c) and (a) and (b), combined.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of block copolymer to aromatic polycarbonate can vary widely, i.e., within the range of 1 to 99 parts of the former to, correspondingly, 99 to 1 parts of the latter, but in general, from 60 to 40 parts of the polar blocked copolymer will be present for each 40 to 60 parts of the aromatic polycarbonate per 100 parts by weight of (b).

The impact modified polyesters, alone, or in combination with a filler can be rendered flame retardant with an effective amount of a conventional flame retardant agent (d). As is well known, flame retardants can be based on elementary red phosphorus compounds, halogen and nitrogen compounds alone or preferably in further combination with synergists, such as antimony compounds. Especially useful are polymeric and oligomeric flame retardant agents comprising tetrabromobisphenol-A carbonate units, see, for example, Wambach, U.S. Pat. No. 3,833,685, which is incorporated herein by reference.

Other ingredients, such as dyes, pigments, drip retardants, and the like can be added for their conventionally employed purposes.

The compositions of this invention can be prepared by a number of procedures. In one way, the modifier and any reinforcement, e.g., glass fibers, or non-reinforcing filler or fire retardants is put into an extrusion compounder with the resinous components to produce molding pellets. The modifier, and filler and/or reinforcement, if any, is dispersed in a matrix of the resin in the process. In another procedure, the modifier is mixed with the resins by dry blending, then either fluxed on a mill and comminuted, or then are extruded and chopped. The modifying agent can also be mixed with the resins and directly molded, e.g., by injection or transfer molding techniques.

It is always important to thoroughly free all of the ingredients; resin, modifier, reinforcement, filler, if used, and any optional, conventional additives from as much water as possible.

In addition, compounding should be carried out to ensure that the residence time in the machine is short; the temperature is carefully controlled; the friction heat is utilized; and an intimate blend between the resin and the modifier is obtained.

Although it is not essential, best results are obtained if the ingredients are pre-compounded, pelletized and then molded. Pre-compounding can be carried out in conventional equipment. For example, after carefully pre-drying the polyester and modifier and the reinforcing agent, or filler, if used, e.g. four hours at 250° F., a single screw extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and reinforcement down stream. In either case, a generally suitable machine temperature will be about 450° to 560° F.

The precompounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–525° F. and conventional mold temperatures, e.g., 130°–150° F.

DESCRIPTION OF THE PREFERRED EMBODIMENTS

The following examples illustrate the invention. They are set forth as a further description but are not to be construed as limiting the invention thereto.

EXAMPLES 1–4

Dry blends of poly(1,4-butylene terephthalate) resin (PBT), caprolactone polar blocked butadiene styrene and/or butadiene copolymer resin, aromatic polycarbonate of bisphenol-A and phosgene and mold release/stabilizer are compounded and extruded at 520° F. in an extruder. The extrudate is pelletized and injection molded at 520° F. (mold temperature 130° F.) A control is also run. The formulations and physical properties are shown in Table 1.

TABLE 1

Compositions Comprising Polyesters, A Polar End Capped Block Copolymer And An Aromatic Polycarbonate

| Example | A* | 1 | 2 | 3 | 4 |
|---|---|---|---|---|---|
| Composition (parts by weight) | | | | | |
| Poly(1,4-butylene terephthalate)[a] | 99.8 | 68.3 | 68.3 | 68.3 | 68.3 |
| S-B-Polar block copolymer[b][i] | — | 15 | — | — | — |
| B-Polar block copolymer[b][i]' | — | — | 15 | — | — |
| S-B-Polar block copolymer[b][i]'' | — | — | — | — | 15 |
| S-B-Polar block copolymer[b][i]''' | — | — | — | 15 | — |
| Aromatic polycarbonate[b][ii] | — | 15 | 15 | 15 | 15 |
| Mold release/stabilizers(to make 100) | | | | | |
| Properties | | | | | |
| Distortion Temperature, Under Load, 264° F., at 264 psi | 142 | 130 | 135 | 131 | 124 |
| Tensile Strength, psi | 7500 | 6479 | 5999 | 6266 | 6434 |
| Modulus, psi | 340,000 | 288,031 | 272,791 | 270,000 | 300,000 |
| Notched Izod impact strength, ft.-lbs./in. ⅛" sample | 1.0 | 2.67 | 15.95 | 2.46 | 2.38 |
| Notched Izod impact strength, ft.-lbs./in. ¼" sample | 1.0 | N.D.** | 3.58 | N.D. | N.D. |
| Gardner Impact strength, in.-lbs. | 360 | 480 | 480 | 56 | 425 |

*Control
**N.D. - not determined
[a]Valox 315, General Electric Co.
[b][i]PD-0220, Phillips Chemical Co., m.w. 150,000; 25/50/25 styrene/butadiene/caprolactone
[b][i]'PD-0221, Phillips Chemical Co., m.w. 135,000; 75/25 butadiene/caprolactone
[b][i]''PD-0222, Phillips Chemical Co., m.w., 60,000; 10/50/40 styrene/butadiene/caprolactone
[b][i]'''PD-0223, Phillips Chemical Co., m.w., 35,000; 40/50/10 styrene/butadiene/caprolactone
[b][ii]Lexan 135, General Electric Co.

The excellent impact strengths can be seen.

EXAMPLES 5–7

The general procedure of Example 1 is used to make glass and mineral filled composition of poly(1,4-butylene terephthalate), poly(ethylene terephthalate), polar blocked butadiene copolymer resin and an aromatic polycarbonate with excellent impact strength after molding. The formulations and properties are set forth in Table 2.

TABLE 2

Glass and Mineral Filled Composition Comprising polyester, End-blocked Copolymer and Polycarbonate

| Example | 5A* | 5 | 6 | 7 |
|---|---|---|---|---|
| Composition (parts by weight) | | | | |
| Poly(1,4-butylene terephthalate)[a] | 68.8 | 38.3 | 47.2 | 39.7 |
| B-Block Copolymer[b][i]' | — | 15 | 7.5 | 15 |
| Aromatic Polycarbonate[b][ii] | — | 15 | 15 | 15 |
| Glass fibers | 30 | 30 | — | — |
| Clay[c][ii] | — | — | 29.7 | 29.7 |
| Mold release/stabilizers (to make 100) | | | | |

TABLE 2-continued

Glass and Mineral Filled Composition Comprising polyester, End-blocked Copolymer and Polycarbonate

| Example | 5A* | 5 | 6 | 7 |
|---|---|---|---|---|
| Properties | | | | |
| Distortion Temperature, Under Load, 264° F. at 264 psi | 405 | 221 | 137 | 150 |
| Tensile strength, psi | 17,300 | 9,461 | 6,450 | 4,700 |
| Modulus, psi | 1,100,000 | 650,000 | 440,000 | 320,000 |
| Notched Izod Impact strength ft.-lbs./in., ⅛"sample | 1.8 | 4.5 | 1.9 | 2.1 |
| Gardner impact strength, in.lbs. | N.D. | 56 | 350 | 250 |

*Control
(a)Valox 315, General Electric Co.
(b)(i)PD-0221, Phillips Chemical Co., see Footnote to Table 1
(b)(ii)Lexan 135, General Electric Co.
(c)(ii)Satintone, surface treated with A-1100 silane coupling agent.

EXAMPLES 8–10

Impact modified compositions comprising a combination of poly(1,4-butylene terephthalate and poly(ethylene terephthalate), a block copolyester of poly(1,4-butylene terephthalate) and an aromatic polycarbonate and one with a flame retardant agent are prepared by the general procedure of Example 1. The formulations and properties are set forth in Table 3.

TABLE 3

Compositions Comprising Polyesters or Copolyester, Polar End Capped Butadiene Copolymer, Polycarbonate and Flame Retardants

| Example | 8 | 9 | 10 |
|---|---|---|---|
| Composition (parts by weight) | | | |
| Poly(1,4-butylene terephthalate)(a) | 53.3 | — | 38.8 |
| Copolyester of poly(1,4-butylene terephthalate)(a)(i) | — | 68.3 | — |
| Poly(ethylene terephthalate) | 15 | — | — |
| B-Block Copolymer(b)(i)' | 15 | 15 | 15 |
| Aromatic Polycarbonate(b)(ii) | 15 | 15 | 15 |
| Copolycabonate of 50–50 tetrabromobisphenol-A/bisphenol-A | — | — | 28 |
| Antimony oxide | — | — | 5.0 |
| Mold release/stabilizer (to make 100) | | | |
| Properties | | | |
| Distortion Temperature, Under Load, 264° F. at 264 psi | 133 | 108 | 213 |
| Tensile strength, psi | 6165 | 4600 | 7584 |
| Modulus, psi | 280,000 | N.D. | 330,000 |
| Notched Izod Impact strength, ft.lbs./in., ⅛" sample | 13.8 | 3.0 | 11.4 |
| Gardner impact strength, in.lbs. | 448 | 275 | 438 |

(a)Valox 315, General Electric Co.
(a)(i)Valox 330, General Electric Co.
(b)(i)PD-0221, Phillips Chemical Co., see Footnote to Table 1
(b)(ii)Lexan 135, General Electric Co.

Obviously, other modifications and variations of the present invention are possible in the light of the above teachings. For example, the copolyester can be partially replaced with poly(ethylene terephthalate). The polar end capped block copolymer can be branched, i.e., a radial teleblock structure. It is therefore, to be understood that changes may be made in the particular embodiments described above which are within the scope of the invention as defined in the appended claims.

I claim:

1. A thermoplastic composition comprising:
   (a) a polyester composition comprising:
      (i) a poly(1,4-butylene terephthalate) resin;
      (ii) a blend of a poly(1,4-butylene terephthalate) resin and a poly(ethylene terephthalate) resin;
      (iii) a block copolyester of poly(1,4-butylene terephthalate) and an aromatic with aliphatic or aliphatic polyester;
      (iv) a blend of (iii) and a poly(ethylene terephthalate) resin; or
      (v) a blend of (iii) and a poly(1,4-butylene terephthalate) resin; and
   (b) an impact modifier therefor comprising a combination of:
      (i) a linear or branched rubbery polyester end blocked copolymer of a vinyl aromatic and a conjugated diene, a polyester end blocked homopolymer of a conjugated diene, vinyl aromatic or a mixture thereof and
      (ii) an aromatic polycarbonate resin, in an amount of up to 60 parts per 100 parts by weight of (a) and (b) together.

2. A composition as defined in claim 1 wherein the impact modifier (b) is present in an amount of at least about 1.0 parts by weight per 100 parts by weight of (a) and (b) together.

3. A composition as defined in claim 1 wherein the modifier (b) is present in an amount of from about 2.5 to about 50 parts by weight per 100 parts by weight of (a) and (b) together.

4. A composition as defined in claim 1 wherein each said polyester in component (a) has an intrinsic viscosity of at least about 0.4 deciliters/gram when measured in a solution in a 60:40 mixture of phenol and tetrachloroethane at 30° C.

5. A composition as defined in claim 4 wherein each said polyester in component (a) has an intrinsic viscosity of at least about 0.6 deciliters per gram when measured in a solution in a 60:40 mixture of phenol and tetrachloroethane at 30° C.

6. A composition as defined in claim 1 wherein in components (a)(i), (a)(ii) and (a)(v), said poly(1,4-butylene terephthalate) resin is linear or branched.

7. A composition as defined in claim 6 wherein said branched polyester is a high melt viscosity (1,4-butylene terephthalate) resin which includes a small amount of a branching component containing at least three ester forming groups.

8. A composition as defined in claim 1 wherein said block copolymer resin component (b)(i) comprises from 0 to 45 parts by weight of the vinyl aromatic compound and from 99 to 45 parts by weight of the conjugated diene and from 5 to 50 parts by weight of the polyester blocks, per 100 parts by weight of the block copolymer.

9. A composition as defined in claim 1 wherein said block copolymer resin component (b)(i) is end blocked with caprolactone.

10. A composition as defined in claim 1 wherein in said block copolymer (b)(i), the vinyl aromatic compound is styrene, the conjugated diene is butadiene and the polyester component comprises caprolactone.

11. A composition as defined in claim 1 wherein said aromatic polycarbonate resin includes units derived from bisphenol-A.

12. A composition as defined in claim 1 which also includes (c) a filler, reinforcing agent or a mixture thereof in an amount of from about 1 to about 60 parts by weight per 100 parts by weight of (a), (b) and (c) together.

13. A thermoplastic composition as defined in claim 12 wherein component (c) comprises (c)(i) fibrous glass.

14. A composition as defined in claim 1 which also includes (d) a flame-retardant amount of a flame retarding agent.

15. A composition as defined in claim 14 wherein component (d) comprises an aromatic polycarbonate containing units of tetrabromobisphenol-A and said units are present in said composition in an amount at least sufficient to render the composition flame retardant.

16. A composition as defined in claim 1 wherein component (c) comprises (ii) a mineral filler.

17. A composition as defined in claim 16 wherein component (c)(ii) comprises a clay.

18. A composition as defined in claim 1 which also includes (c) a filler, reinforcing agent or a mixture thereof in an amount of from about 1 to about 60 parts by weight per 100 parts by weight of (a), (b) and (c) together and (d) a flame-retardant amount of a flame retarding agent.

19. A composition as defined in claim 18 wherein component (c) comprises (i) fibrous glass.

20. A composition as defined in claim 18 wherein component (c) comprises (ii) a mineral filler.

* * * * *